United States Patent
Lindauer et al.

(10) Patent No.: US 8,602,353 B2
(45) Date of Patent: *Dec. 10, 2013

(54) MONUMENT WITH AN AUTONOMOUS WATER MODULE

(75) Inventors: Christiane Lindauer, Hamburg (DE); Axel Schreiner, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 17 days.

This patent is subject to a terminal disclaimer.

(21) Appl. No.: 13/298,792

(22) Filed: Nov. 17, 2011

(65) Prior Publication Data

US 2012/0056036 A1    Mar. 8, 2012

Related U.S. Application Data

(63) Continuation of application No. PCT/EP2010/056920, filed on May 19, 2010.

(60) Provisional application No. 61/179,470, filed on May 19, 2009.

(30) Foreign Application Priority Data

May 19, 2009    (DE) .......................... 10 2009 021 970

(51) Int. Cl.
*B64D 11/00* (2006.01)
*B64D 13/00* (2006.01)

(52) U.S. Cl.
USPC ...................................................... 244/118.5

(58) Field of Classification Search
USPC ........ 244/118.5; 222/608; 280/47.34–47.371; 312/236
See application file for complete search history.

(56) References Cited

U.S. PATENT DOCUMENTS

| | | | | |
|---|---|---|---|---|
| 3,983,583 A * | 10/1976 | Herman et al. | ................. | 62/331 |
| 4,072,157 A * | 2/1978 | Wines et al. | ................. | 134/58 R |
| 4,942,631 A * | 7/1990 | Rosa | ................. | 4/623 |
| 5,083,727 A | 1/1992 | Pompei et al. | | |
| 5,303,739 A | 4/1994 | Ellgoth et al. | | |
| 5,465,438 A * | 11/1995 | Allman et al. | ................. | 4/626 |
| 5,769,124 A | 6/1998 | Ehrhardt | | |
| 6,173,458 B1 * | 1/2001 | Maddux | ................. | 4/626 |
| 6,711,757 B2 * | 3/2004 | Peck | ................. | 4/516 |
| 7,731,127 B2 | 6/2010 | Hoffjann et al. | | |
| 8,082,611 B1 * | 12/2011 | Marshall | ................. | 4/625 |

(Continued)

FOREIGN PATENT DOCUMENTS

| | | |
|---|---|---|
| DE | 19809297 A1 | 9/1999 |
| DE | 10341523 A1 | 4/2005 |

(Continued)

*Primary Examiner* — Tien Dinh
*Assistant Examiner* — Michael A Fabula
(74) *Attorney, Agent, or Firm* — Ingrassia Fisher & Lorenz, P.C.

(57) ABSTRACT

An autonomous water module is provided for aircraft, preferably a water module embodied as a water trolley, and to a monument for aircraft, which includes, but is not limited to a device for receiving said type of water module, and finally, an aircraft equipped with said type of autonomous water module and/or said type of monument. The autonomous water module includes, but is not limited to a container having the standard dimensions of a trolley, and the container includes, but is not limited to a fresh-water tank, a device for dispensing fresh water, and a device for discharging gray water.

14 Claims, 1 Drawing Sheet

(56) References Cited

U.S. PATENT DOCUMENTS

| | | | |
|---|---|---|---|
| 8,322,732 B2 * | 12/2012 | McKay et al. | 280/47.35 |
| 2001/0052681 A1 * | 12/2001 | Deavila | 280/47.19 |
| 2005/0230539 A1 | 10/2005 | Quan | |
| 2006/0102431 A1 * | 5/2006 | Switzer | 186/4 |
| 2007/0033730 A1 * | 2/2007 | Bean | 4/619 |
| 2007/0256236 A1 * | 11/2007 | Switzer | 4/626 |
| 2008/0127411 A1 | 6/2008 | Hoffjann et al. | |
| 2010/0225163 A1 | 9/2010 | Knepple et al. | |
| 2012/0060271 A1 * | 3/2012 | Dannenberg et al. | 4/321 |

FOREIGN PATENT DOCUMENTS

| | | |
|---|---|---|
| DE | 102005022855 A1 | 12/2006 |
| DE | 102006021204 A1 | 11/2007 |
| DE | 102006042300 A1 | 3/2008 |
| DE | 102007029677 A1 | 1/2009 |
| DE | 102007054291 A1 | 4/2009 |
| DE | 102009021970 A1 | 11/2010 |

* cited by examiner

MONUMENT WITH AN AUTONOMOUS WATER MODULE

CROSS-REFERENCE TO RELATED APPLICATIONS

This application is a continuation of International Application No. PCT/EP2010/056920, filed May 19, 2010, which was published under PCT Article 21(2) and which claims priority to German Patent Application No. 10 2009 021 970.6, filed May 19, 2009 and of the U.S. Provisional Patent Application No. 61/179,470, filed May 19, 2009, the disclosure of which applications is hereby incorporated herein by reference.

TECHNICAL FIELD

The technical field relates to water/waste systems of aircraft, in particular of passenger aircraft. In particular, the technical field relates to a monument for aircraft, with a device for receiving an autonomous water module, and with an autonomous water module for an aircraft arranged in the device with a container with the standard dimensions of a trolley. The container comprises a fresh-water tank, a device for supplying fresh water, and a device for removing gray water. Furthermore, the technical field relates to an aircraft comprising such an autonomous water module.

BACKGROUND

Aircraft used in civil aviation comprise a water/waste system in which a drinking water system, a waste water system, and a toilet system are provided. Furthermore, a so-called gray-water system can be provided in which service water from all the basins and sinks, namely hand basins in on-board lavatories and sinks in galleys, is collected in a central location. Overall, the gray water comprises fresh water with additions such as soap and/or residues of coffee, tea, juices or other drinks. The gray water can be discharged from the gray-water system to the outside of the aircraft by way of a drain mast (discharge connecting piece for aircraft waste water).

In a conventional water/waste system of an aircraft the supply of all water consumers, for example basins, lavatories, galleys, water dispensers, takes place from a central fresh-water system, namely in a pressurized manner or by way of pump systems. Used water is removed to the gray-water system or to the toilet system or to the waste/water system. The equipment for the supply and discharge of water is in each case predominantly integrated in modular units, so-called monuments, such as toilet monuments or galley monuments. Monuments are modular units that are of such a bulky manner that after construction of the aircraft they no longer fit through the door openings of the fuselage of the aircraft.

From U.S. Pat. No. 5,769,124 a fresh-water supply system for aircraft is known that comprises a ventable water tank, water supply lines for consumers such as sinks for galleys and hand basins, fill lines and discharge lines, and a multi-function valve that replaces several conventional valves, thus simplifying the system.

From U.S. Pat. No. 5,303,739 a fresh-water supply system for aircraft is known that comprises a main water-supply line that by way of a controllable valve is connected to an additional tank provided near a water removal position. First, the additional tank is filled with water by way of the main water-supply line, and then the tank is separated from the main water-supply line by means of the valve which at the same time vents the main water-supply line. As long as there is sufficient water in the additional tank there is thus no water present in the main water-supply line, which water may freeze during excessively low temperatures.

From DE 10 2005 022 855 a gray-water disposal device for aircraft is known which comprises a special drain mast connection that makes it possible to quickly and easily replace a damaged drain mast.

For providing passengers with food and beverages, trolleys are used in civil aviation, namely containers with standardized dimensions for receiving food and/or beverages. Essentially ATLAS has prevailed as the standard, but to a lesser extent trolleys according to the KSSU standard are also used. Prior to a flight, trolleys loaded with food and/or beverages are rolled into suitable receiving devices in the galley and are fixed in those locations; subsequently, during the flight, they are removed from those locations as required and are rolled to the passengers.

In standard water systems of aircraft, which standard water systems are designed as described above, in flight operation during a period of time that the aircraft spends on the ground, central maintenance needs to take place. The consumed water with all its additions is discharged and fresh water is topped up. The required cleaning of the galleys and lavatories, which in each case are installed in a corresponding monument, is time consuming.

At prescribed intervals standard disinfection of the entire water system is required, which disinfection needs to take place during the maintenance cycles of the aircraft, and which requires considerable expenditure of time. Even if for example as a result of an infection with germs only a single monument would have to be disinfected, the entire aircraft water system needs to be disinfected.

If in existing monuments such as toilet monuments and galley monuments adaptation to customer requirements is to take place, the monument in question needs to be completely de-installed, which is associated with considerable expenditure of time and money.

In the case of a defect of the water supply within a toilet or galley of the aircraft, the repair needs to be carried out during ground times of the aircraft.

In view of the foregoing, at least one object is to facilitate handling and operation, in particular maintenance, of galley monuments and toilet monuments of aircraft (airplanes). In addition, other objects, desirable features and characteristics will become apparent from the subsequent summary and detailed description, and the appended claims, taken in conjunction with the accompanying drawings and this background.

SUMMARY

This object is met by the monument for aircraft according to the invention with a device for receiving a specific autonomous water module, and by an aircraft comprising such an autonomous water module.

The autonomous water module for an aircraft essentially comprises a container with the standard dimensions of a trolley. The container comprises a fresh-water tank, a device for dispensing fresh water, and a device for discharging gray water. As a result of the dedicated fresh-water tank of the autonomous water module the weight associated with a central water supply (fresh water supply) can be saved. In order to further improve the autonomy of the water module, preferably the device for discharging gray water comprises a gray-water tank. In this manner it is also possible to save the weight associated with the components of the hitherto provided central device for gray-water disposal. Such a water module is thus autonomous both in terms of fresh-water disposal and in terms of gray-water disposal.

By externally servicing such an autonomous water module, ground times during turnaround, during standard servicing intervals, and for troubleshooting of the water supply system are shortened or avoided. Servicing the water module can, for example, take place in such a manner that it is exchanged at the catering department and is cleaned in a manner similar to that of trolleys intended for food and beverages, and is prepared for renewed use.

If individual water fittings are soiled, this does not affect the entire aircraft water system with all the consumers connected thereto; individual water modules can be cleaned and disinfected in a targeted manner.

As a result of the modular design the aircraft toilet system can be configured individually and quickly. Any exchange of fittings can take place on the trolley outside the aircraft. Adaptation to customer wishes or to the state of the art is possible without any problems.

According to an embodiment, the water module is designed as a water trolley comprising rollers on the bottom of the container. Thus, such a water module provides all the advantages of a trolley which hitherto was only used to supply passengers with food and beverages. The rollers of such a water trolley allow transport without any problem, just as in the hitherto known trolleys, of the water trolley to its location of use or away from it for the purpose of service or repair.

In order to further improve the versatility of the water module, said water module preferably comprises a waste container for receiving waste such as kitchen waste, cleaning towels and the like.

Preferably, in the water module comprises a fill-level measuring device for the fresh-water tank and/or the gray-water tank and/or the waste container. By means of such a fill-level measuring device it is easy to determine whether the minimum water level in the fresh-water tank has been reached or whether the maximum water level in the gray-water tank or the maximum fill level in the waste container has been reached, and thus subsequently the water module can be exchanged and can be rendered operational again or can be exchanged for an operational water module. Preferably, the parameters acquired by a fill-level measuring device are communicated to a central position in the aircraft. However, it is also possible for a device for displaying the fill level or the fill levels to be provided on the water module.

Preferably, the water module comprises at least one securing mechanism for detachable connection to a component, for example a monument, of the aircraft. Such a securing mechanism is, for example, designed as a mechanical quick-action locking device. If in addition a device for coupling the securing mechanism to the on-board system of the aircraft is provided, it is possible, by way of the on-board system of the aircraft, to determine whether the securing mechanism of the water module has been properly locked. Furthermore, in such a case, in order to prevent unauthorized release of the securing mechanism, action can be taken so that the securing mechanism can only be released, in other words unlocked, by way of the on-board system of the aircraft.

The above-mentioned connections of the water module to the on-board system of the aircraft preferably take place by way of a controller of the water module.

In the case of the design of the water module as a water trolley with rollers provided on the bottom of the container, preferably a device for fixing the rollers is provided; it is used for securely fixing the water trolley during a stopover, and in particular at its final place of use. In order to assimilate the visual impression of the water trolley to that of existing devices, in order to prevent dirty corners and possible vandalism, a panel for covering the rollers at the place of use of the water trolley can be provided.

If, for example in the case of a hand basin or a sink, a supply of hot water is desired, preferably a water heater for heating the fresh water is provided in the water module according to the invention. This obviates the need for a central hot water supply in the aircraft, and consequently energy loss as a result of the cooling effect of long hot water lines, or the provision of expensive insulation can be avoided. For the purpose of setting the temperature of the service water, preferably, on the water module a mixing unit for mixing heated fresh water with non-heated fresh water is provided.

A monument for aircraft with a device for receiving an autonomous water module designed as mentioned above makes it possible, with corresponding adaptation of the monument, or more precisely expressed of its water supply, for the monument to remain in the aircraft rather than having to be removed, which results in considerable savings in time and money for aircraft operators.

The above-mentioned advantages correspondingly come to bear in an aircraft comprising a monument designed as described.

BRIEF DESCRIPTION OF THE DRAWINGS

Below, an exemplary embodiment of the invention is explained in more detail with reference to the enclosed drawings. The following are shown.

DETAILED DESCRIPTION

Below, the water module according to an embodiment is described with reference to a preferred embodiment, namely a water trolley. However, the water module need not necessarily comprise rollers on the bottom, as is the case with a water trolley. The water module can, for example, also be transported by means of a separate transportation device.

Figure 1:
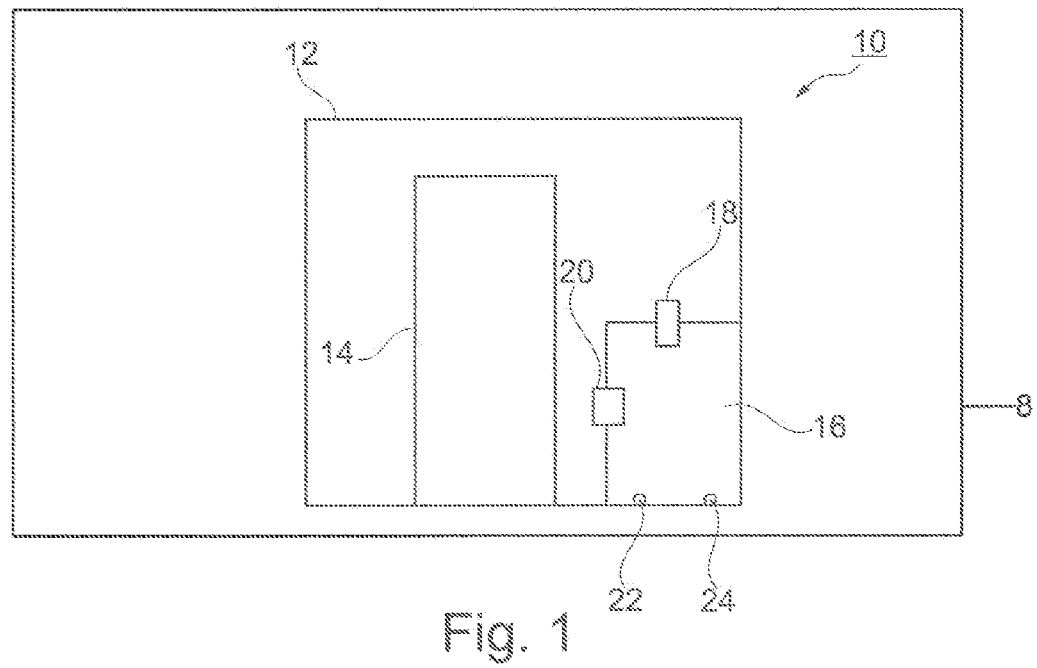
FIG. 1 is a lateral partial section view of an on-board toilet monument comprising a water trolley according to an embodiment.

FIG. 1 shows a lateral view of a toilet monument 10 of an aircraft 8, comprising a front wall 12 in which a door 14 is provided. In the toilet monument 10 a water trolley 16 according to the invention is arranged, which water trolley 16 can be moved, by means of rollers 22, 24 at its bottom, into and out of the toilet monument 10. Securing mechanisms 18, 20 are provided for fixing the water trolley 16 in the toilet monument 10.

Figure 2:
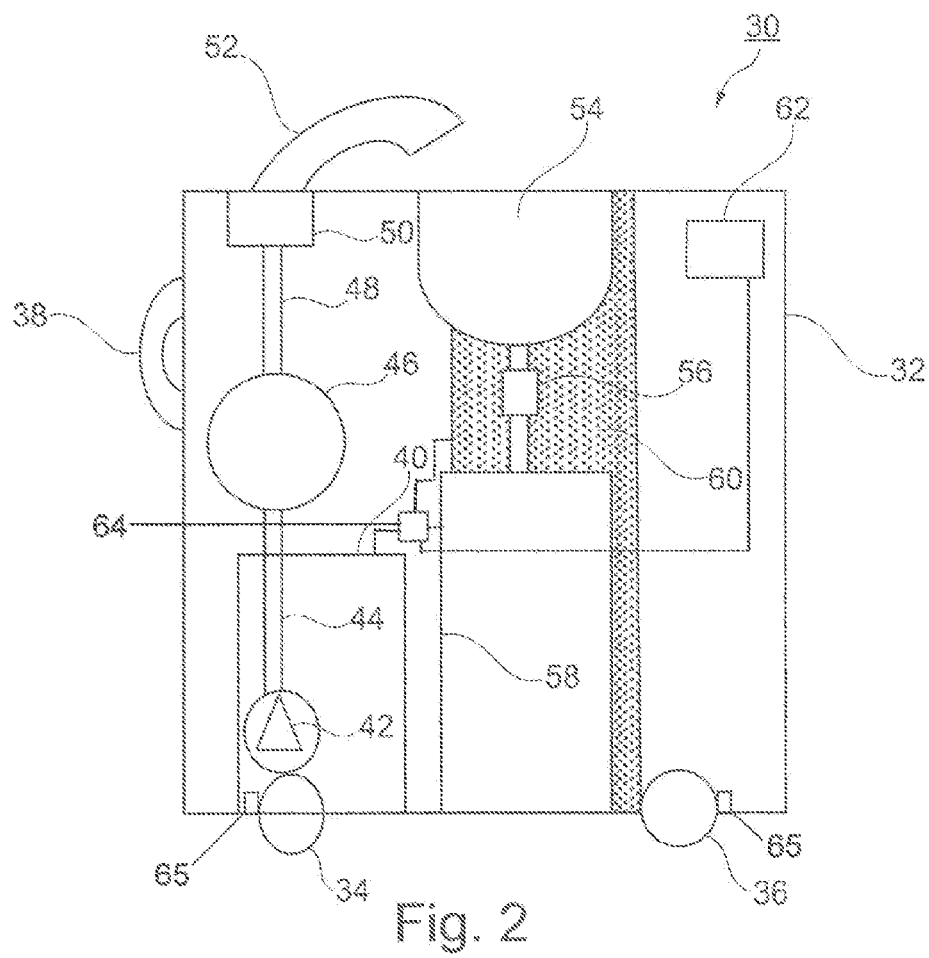
FIG. 2 is a lateral partial section view of a water trolley according to an embodiment.

With reference to the water trolley 30 shown in FIG. 2, the water trolley shown in FIG. 1 is explained in more detail. The water trolley 30 comprises a container 32 with functional elements of the water trolley arranged therein or thereon. At the bottom of the container 32 four rollers are provided for transport, with FIG. 2 showing only two rollers 34, 36. To facilitate transport of the water trolley 30 the container 32 comprises a handle 38.

In the interior of the container 32 a fresh-water tank 40 is provided, from which fresh water can be obtained by means of a pump 42 by way of a riser pipe 44. Optionally a water heater 46 for heating the fresh water can be provided. By way of a further riser pipe 48 the fresh water then reaches a faucet 52 which delivers it to a basin 54. If the water heater 46 is provided, there is also a mixing unit 50 by means of which the desired temperature of the water emanating from the faucet 52 can be set or regulated.

Water (or gray water) from the basin 54 reaches a gray-water tank 58 by way of an odor trap 56.

Furthermore, in the container 32 optionally a waste container 60 is provided for receiving towels and the like. A controller 62 is used to control the functions of the water trolley 30 and/or to communicate with the aircraft electronics.

Optionally in each case a fill-level measuring device is provided for the fresh-water tank 40 and/or the gray-water tank 58 and/or the waste container 60. By means of said fill-level measuring device 64, for example the minimum permissible fill level of fresh water or the maximum permissible fill level of gray water or the maximum permissible fill level of waste is registered and preferably transmitted to the controller 62 from where it is transmitted to a suitable display device (not shown). Particularly preferably the controller 62 is connected to the aircraft electronics, for example by way of the cabin intercommunication data system, CIDS, to the forward attendant panel, FAP, in order to display the respective fill levels on the FAP.

By way of the controller 62 it is also possible to monitor or control the securing mechanisms 18, 20 shown in FIG. 10. For example, proper locking of the securing mechanisms 18, 20, and thus of the water trolley 16 in the toilet monument 10, can be reported to the FAP by way of the controller 62. Furthermore, as a safety measure it can be provided for unlocking or release of the securing mechanisms 18, 20 to be able to take place only from the FAP in order to prevent unauthorized removal of the water trolley 16 (30).

The rollers 22, 24 of the water trolley 16 and the rollers 34, 36 of the water trolley 30 preferably comprise a locking device 65 (FIG. 2), which is activated as soon as the water trolley 16 (30) has been moved to its place of use, in order to lock the rollers 22, 24 (34, 36).

Optionally it is also possible to provide a remote control device for the water trolley 16 or 30 for it to automatically find its parking space, and/or for remotely-controlled unlocking of the water trolley from the associated monument, and/or for reaching a service point for the water trolley, preferably provided the minimum fill level of fresh water or the maximum fill level of gray water or the maximum fill level of waste has been reached.

Preferably, the water trolley 16 (30) can emit an error message, for example by way of the controller 62, if a malfunction occurs in one of the functional elements of the water trolley.

The water trolley can comprise connection elements for connection to the electricity supply network of the aircraft. In this manner the electricity supply to those functional elements of the water trolley is ensured, which functional elements require electrical energy for operation. This relates, for example, to fill-level measuring devices, the pump 42, the water heater 46, the mixing unit 50, or the controller 62.

However, optionally, each water trolley can also comprise its own electricity supply with a battery of its own.

The term "standard dimensions of a trolley" should be interpreted to the effect that it also comprises multiples thereof, for example the dimensions of two standard trolleys arranged side by side.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above.

What is claimed is:

1. A toilet module for an aircraft, comprising:
a self-contained water module having a container; and
a securing mechanism on the aircraft configured to receive the self-contained water module;
wherein, the container comprises:
a fresh-water tank;
a first device configured to supply fresh water; and
a second device configured to remove gray water.

2. The toilet module of claim 1, wherein the second device comprises a gray-water tank.

3. The toilet module of claim 1, wherein the self-contained water module is a water trolley comprising rollers on a bottom of the container.

4. The toilet module of claim 1, wherein the self-contained water module comprises a waste container.

5. The toilet module of claim 1, wherein the self-contained water module comprises a fill-level measuring device for the fresh-water tank.

6. The toilet module of claim 1, wherein the securing mechanism is a mechanical quick-action locking device.

7. The toilet module of claim 1, wherein the self-contained water module comprises a controller that is configured to connect to an on-board system of the aircraft.

8. The toilet module of claim 3, wherein the self-contained water module comprises a third device configured to fix the rollers.

9. The toilet module of claim 1, wherein the self-contained water module comprises a water heater for heating the fresh water.

10. The toilet module of claim 9, wherein the self-contained water module comprises a mixing unit configured to regulate a temperature of the water.

11. An aircraft, comprising:
a self-contained water module having a container; and
a securing mechanism on the aircraft configured to receive the self-contained water module;
wherein, the container of the self-contained water module comprises:
a fresh-water tank;
a first device configured to supply fresh water; and
a second device configured to remove gray water.

12. The aircraft of claim 11, wherein the second device comprises a gray-water tank.

13. The aircraft of claim 11, wherein the self-contained water module is a water trolley comprising rollers on a bottom of the container.

14. The aircraft of claim 11, wherein the self-contained water module comprises a waste container.

\* \* \* \* \*